United States Patent [19]
Spittle

[11] Patent Number: 6,158,167
[45] Date of Patent: *Dec. 12, 2000

[54] MULCH FLAKES

[75] Inventor: Kevin S. Spittle, Stanley, N.C.

[73] Assignee: Profile Products LLC, Buffalo Grove, Ill.

[*] Notice: This patent is subject to a terminal disclaimer.

[21] Appl. No.: 08/970,065

[22] Filed: Nov. 13, 1997

[51] Int. Cl.⁷ ....................................................... A01G 7/00
[52] U.S. Cl. ........................................................... 47/9
[58] Field of Search ................................. 47/9; 111/144, 111/102; 106/164.3

[56] References Cited

U.S. PATENT DOCUMENTS

| | | | |
|---|---|---|---|
| 5,301,460 | 4/1994 | Corbitt | 47/9 |
| 5,456,733 | 10/1995 | Hamilton, Jr. | 47/9 |
| 5,585,150 | 12/1996 | Sheehan | 47/9 |
| 5,672,434 | 9/1997 | Dalebroux et al. | 47/9 |
| 5,779,782 | 7/1998 | Spittle | 47/9 |

FOREIGN PATENT DOCUMENTS 3431565  3/1985  Germany ..................... 47/9

*Primary Examiner*—Michael J. Carone
*Assistant Examiner*—Son T. Nguyen
*Attorney, Agent, or Firm*—Brooks & Kushman P.C.

[57] ABSTRACT

Mulch flakes made from finely divided paper and/or wood, and a surfactant. The flakes include surfactant which allows them to very quickly absorb about nine times their weight in water. This quick absorbency feature allows the flakes to be added more quickly to jet-agitated hydro-mulching tanks. Once sprayed on the ground, the flakes substantially reduce water run-off and soil erosion as compared to other mulches.

18 Claims, No Drawings

MULCH FLAKES

FIELD OF THE INVENTION

This invention relates to mulch flakes which effectively mulch a seed bed.

BACKGROUND OF THE INVENTION

Seed bed mulches accomplish a number of functions. They protect the soil and seed from water and wind erosion, reduce evaporation from the soil surface, increase the humidity of the soil, moderate temperature fluctuations at the soil surface, and dissipate the energy of falling water droplets to decrease disturbance of the soil surface.

There are many types of mulch available. Straw and hay are somewhat effective, but contaminate the seed bed with weed seeds. Pelletized mulches are weed-free, and can be applied with standard rotary or drop spreaders. However, such mulches are fairly dense. Because of the density, it would be necessary to apply these mulches at an extremely high rate in pounds per area in order to cover a substantial amount of the seed bed area. Consequently, mulch pellets are applied to cover only a portion of the seed bed. As a result, they are not as effective as other mulches in protecting the underlying seed bed.

Jet agitated hydro-mulching machines typically carry a plastic mixing tank with a relatively small (perhaps one foot in diameter) top opening for adding the mulch to the water in the tank. Currently used paper-based fibrous mulches are sold in bales, which must be broken up and slowly added by hand into the mixing tank. It may take an hour to add 150 pounds of such mulch to a 500 gallon mixing tank. Thus, although these machines are relatively inexpensive, the labor costs of using such machines is extremely high.

SUMMARY OF THE INVENTION

It is therefore an object of this invention to provide mulch flakes which a re faster to load into jet-agitated hydro-mulching mixing tanks.

It is a further object of this invention to provide such mulch flakes which can be added very quickly into the tank of a jet-agitated hydro-mulching machine, which translates into substantial time savings for the hydro-mulch application process, thus reducing the application cost.

This invention features mulch flakes for application to a ground surface, comprising finely-divided paper, and/or finely-divided wood, and a surfactant, wherein the paper, wood, and surfactant are intimately mixed and formed into flakes for application to a ground surface.

The finely-divided paper may be made from waste paper, in which case the mulch flakes preferably include about 80% paper. The finely-divided wood may be sawdust, in which case the mulch flakes preferably include about 20% wood. The surfactant may be polyalkylene glycol. The mulch flakes preferably include at least about 0.2% surfactant. The high surfactant level causes the flakes to very quickly absorb a substantial amount of water, and sink. This allows the flakes to be loaded quickly into a jet-agitated hydro-mulching mixing tank, at the rate of about one pound per second.

The mulch flakes are preferably formulated so that they retain at least eight, and preferably about nine times their weight in water.

This invention also features mulch flakes for application to a ground surface, comprising at least about 80% finely-divided paper, at least about 20% finely-divided wood, and at least about 0.2% surfactant, wherein the paper, wood, and surfactant are intimately mixed and formed into flakes for application to a ground surface. These mulch flakes retain about nine times their weight in water.

DESCRIPTION OF THE PREFERRED EMBODIMENTS

The mulch flakes of this invention comprise an intimately-mixed formulation of finely-divided paper, and/or finely-divided wood, and a surfactant. The finely-divided paper and wood are extremely water absorbent in and of themselves. The addition of a surfactant increases the water retention of the paper and wood particles, and also speeds water absorption. It can double water retention and increase the absorption rate 20 fold.

One preferred embodiment of the mulch flakes of this invention includes: about 80% ±2% finely-divided paper, about 20% ±2% finely-divided wood, and about 0.2% polyalkylene glycol (a surfactant), and more preferably 0.3% ±0.1% polyalkylene glycol. The mulch flakes may include about 0.4% dark green marker dye. The bulk density of the flakes is typically from about 5 to about 20 pounds per cubic foot.

These mulch flakes were produced as follows. Waste newspapers were shredded and processed through a hammer mill. The resulting paper pieces were then introduced into a finish hammer mill. Also added to the finish hammer mill was the appropriate amount of sawdust. The approximate sizes of these components added to the finish hammer mill was as follows. The paper was pieces about ¼ to ¾ inch in length, and the sawdust passed through a 20 mesh screen. The mixture exiting the finish hammer mill had added to it the correct amount of marker dye. The liquid surfactant was then added in the correct proportion to the mixture of solids.

The entire mixture was then processed through a conditioner, in which the correct amount of moisture was sprayed into the mixture as a fine mist as the product was agitated. The mixture was then pelletized into pellets of 3/16 inch diameter, with a length of about 1–1¼ inches. The pellets had a bulk density of about 30–35 pounds per cubic foot. The product was then cooled, to harden and dry the outside skin, to prevent mold growth, and keep the pellets from breaking apart during shipping and application.

The pellets were then granulated into flakes, having a bulk density of about 10–15 pounds per cubic foot, using known granulation equipment.

Mulch flakes according to the preferred embodiment produced in this manner had the following composition (by weight).

| Component | Percentage (by weight) |
| --- | --- |
| Waste paper | 80 ± 2% |
| Sawdust | 20 ± 2% |
| Moisture | 15% maximum |
| Polyalkylene Glycol Surfactant | 0.3 ± 0.1% |
| Dye | 0.4 ± 0.1% |

The inventive mulch flakes had a bulk density of about 10–15 pounds per cubic foot.

The mulch flakes having this composition and produced by this process have a size of about 1/16" to 3/8" in the longest dimension, and are up to about ⅛" thick, at most. The product is thus easy to pour directly into the top opening of a hydro-mulching machine mixing tank. It has been found that 200 pounds of the flake can be added in this manner in about three minutes, which translates into a tank-loading time savings (compared to fiber mulch bales discussed in the Background) of over 95%. This decreases the cost per application. Also, because the product absorbs about 6 to 9 times its weight in water, at a rate of 20 times faster than untreated wood or paper, the product quickly forms a slurry in the mixing tank, and can be easily and quickly spray applied. Fiber mulches take much longer to wet and thoroughly mix in the mixing tank.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. Dry mulch flakes suitable for application to a ground surface in a wet state, comprising:
   at least one of finely-divided paper and finely-divided wood; and
   a surfactant;
   wherein said paper, wood and surfactant are intimately mixed and formed into flakes which exhibit a faster loading rate into agitated mulch tanks as compared to the loading rate of flakes similarly prepared but without the surfactant.

2. The mulch flakes of claim 1 in which said finely-divided paper includes waste paper.

3. The mulch flakes of claim 1 in which the flakes include at least about 50% paper.

4. The mulch flakes of claim 3 in which the flakes include about 80% paper.

5. The mulch flakes of claim 1 in which said finely-divided wood includes sawdust.

6. The mulch flakes of claim 1 in which the flakes include at least about 15% wood.

7. The mulch flakes of claim 1 in which said surfactant includes polyalkylene glycol.

8. The mulch flakes of claim 1 in which the flakes include at least about 0.2% surfactant.

9. The mulch flakes of claim 1 in which the flakes can retain at least about six times their weight in water.

10. The mulch flakes of claim 1 in which the flakes have a bulk density of about 5 to 20 pounds per cubic foot.

11. The mulch flakes of claim 10 in which the flakes have a bulk density of about 10–15 pounds per cubic foot.

12. Mulch flakes for application to a ground surface, comprising:
    about 80% finely-divided paper;
    about 20% finely-divided wood; and
    at least about 0.2% surfactant;
    wherein said paper, wood, and surfactant are intimately mixed and formed into flakes for application to a ground surface.

13. The mulch flakes of claim 12 in which the flakes can retain at least about six times their weight in water.

14. The mulch flakes of claim 12 in which the flakes have a bulk density of about 5–20 pounds per cubic foot.

15. A process for applying mulch to a ground surface, said method comprising:
    a) forming a dry mulch precursor mixture containing at least one of finely divided paper and finely divided wood;
    b) adding a surfactant to said dry mulch precursor mixture;
    c) adding sufficient water to allow the mixture of a) and b) to be compressed into pellets comprising an intimate mixture of paper, finely divided wood, and surfactant;
    d) granulating said pellets to mulch flakes;
    e) adding said flakes to an agitated mulch tank containing water to produce a hydro-mulch;
    f) distributing said hydro-mulch over a ground surface.

16. The process of claim 15 wherein said composition contains about 80% by weight paper and about 20% by weight sawdust relative to the total of paper and sawdust; up to 15% by weight moisture relative to the total composition weight; and about 0.2 to 0.3 weight percent surfactant relative to the total composition weight; and optionally a dye.

17. The process of claim 15, wherein said pellets have a bulk density of 30–35 lbs/ft$^3$.

18. The process of claim 15, wherein said flakes have a bulk density of 10 to 15 lbs/ft$^3$.

* * * * *